W. Grove.
BEST AVAILABLE COPY
Bee Hive.
No. 8,875 X
Patented Jan. 12, 1835.
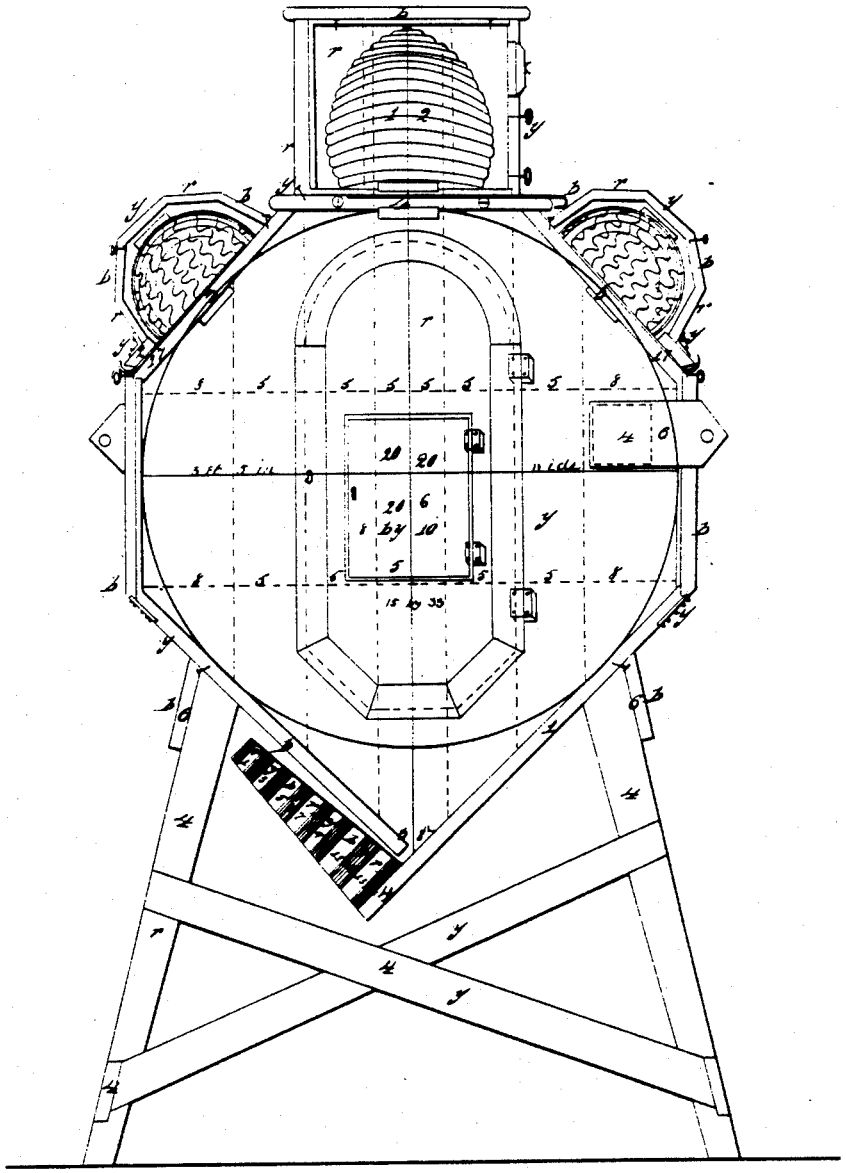
N. PETERS, PHOTO-LITHOGRAPHER, WASHINGTON, D. C.

BEST AVAILABLE COPY

[illegible] [illegible] June 12, 18[illegible]

To all to whom these Letters Patent shall come,
[illegible] it known that I William [illegible] a Citizen of the United States have
[illegible] a "Fortified Bee Palace" on a new and original plan for which I have
obtained a Patent under the Seal of the United States. The said invention has
been pronounced by the best judges to be far superior to anything of the kind
heretofore discovered for beauty, convenience and usefulness. The preservation of
the bees, the procurement of purer and much larger quantities of honey without
destroying or hiving the bees – the great and remarkable increase of their number –
the facility and ease with which the honey can be taken from the house without
even disturbing their ingenious [illegible]; these are some of the most [illegible]
tages arising from the above mentioned invention. The following is a full and
[illegible] description of the construction and operation of said "Palace" – [illegible]
are made of different sizes, according to the number of hives which they are to be
commenced with, but the most ordinary size is one of six feet long and two [illegible] ten inch
inside. They are made of inch boards, pine or poplar [illegible]. The gable ends are made
first, one precisely like the other. After they are prepared, both ought to be de-
scribed, inside and outside, exactly as on the draft, before the boards are nailed
on: First the centre, 16 inches from the top and sides, then the circle, the square
is then brought up to the circle, the top part is equally divided into five [illegible]
by allowing two inches in the top platform, and ½ inch above and below for
the reception of large window glasses, of 4 inches high by 12 wide, so that five
squares will be each 14 inches wide on the outside. The doors are then [illegible]
at 2 inches from the top platform and 13 inches wide, by 2[illegible] high. A glass 6 by
8, is inserted on the inside of each end door (an a little [illegible] as a [illegible] [illegible]) on
the outside (and a hole 4 inches wide, square and 2 inches from the side is cut
out with a rabit, to receive a slide [illegible] of ⅛ of an inch thick. The lines struck
with dots, (see draft.) ought to be marked on the inside of the gable ends. After
the gable ends are thus alike prepared, ploughed, grooved and glued together,
(and the boards all once planed off, warm tar with a pencil should then be
applied to the edges of the gable ends (and in all the joints of the boards, as they are
[illegible]

BEST AVAILABLE COPY with tools shown, (are small strips of two inches wide, with six or eight square under each strip of boards of six inches wide through which the tin plate is inserted, in order to cut off the combs with glass bowls,) are made on the inner edges of the two side platforms, to receive the tin plate and also to keep the glass bowls. Gem has high by 10 wide, which are represented large round bowls, from slipping off on each side there is a box over them of five squares; the three upper squares with the ends are sewed fast, the two front squares are joined (are hung as shutters with hinges sewed to them, by which the bowls are shaped in and out; in these boxes the operations of the bees in the mice is actually seen beautifully, so, than in anything to delight bees. A box is sewed on the left platform to receive the drawers of the front side. The bottom having a hole in the center of one side, in the left front drawer is sewed, by which the honey is taken out in the summer season (and a small glass of 3 in. high by 3 long is fitted in the inside of each drawer, having sticks sewed on to slip along on the outside through all the drawers, is stays between 1 inch (and a book is to be applied to each drawer. But then I was with the drawers the bowls are not used the first year, in the first place after the house is put to its proper place, to the glasses are being fitted in, that is the hives and scraps, as many as it may contain are placed over the hole on the left platform. The hives are then shut up, on the out side around, bees, with a smoker made of a gill of tar, a tea spoonful of sulphur a quart of clay, and some hot water; two small boards are sewed on the two side platforms with tar under them at the hives, as soon as the bees have run their combs down over all the hives, and have sufficient maintenance to last them through the winter, the hives are then cut off with a wire, then cut and a thin tin plate is slipped in under on the holes in order to secure the bees, after the old hives are taken off full of honey and the bees all saved in the "Fortified palace". Then the boards on the side platforms are taken away, and the boxes with the drawers and bowls sewed on; thus the bees have room to spread out in every direction, (and are not idle.) Whenever the intermediate boxes are entirely full, the tin plate is inserted the bottom drawers taken out with new combs and the purest honey. After the ice is unsewed and cut off with a wire, emptied from a spoon, the bees will be working

BEST AVAILABLE COPY

[illegible] on, with a shelf 4 inches wide for the bees to light on (and an open space [illegible] of an inch all along, like at a wind mill, in the [illegible] [illegible] of the
air, in addition to enable them to roll out all offensive matter (and thus
defend themselves [illegible] against all intruding insects. N.B. The boards
are all described crossways in the inside before they are nailed on; afterwards
[illegible] from the marks on the inside at the [illegible] ends) 5 inches apart, crossways
and lengthways 2 [illegible] 8 inches from the ends and sides, in the inside (and ½
inch [illegible] at the [illegible] to be sawed [illegible] the outside,) for small holes for the
reception of upright sticks of one inch square, thick. On the inside of [illegible]
platforms before they are nailed on, holes are described (and cut out, in the
middle [illegible] the top platform, 4 inches wide (and on the side platforms 3 inches
wide round, one foot apart or between every four rows of sticks. The two side
platforms are then nailed on; after they are levelled (and [illegible] the top platform is
screwed on. The inside of the [illegible] ought to be as tight (and even as practica-
ble, but the end doors should not be very tight (and the outlet below ought
always to be left open in order to secure a proper ventilation, to preserve the
bees from smothering; or a base can be made of tin. 3 squares full of small holes
hung with hinges. After the body is thus completed the ends are then screwed (and
[illegible] off (and after the body is smoothened all over, then the doors are cut
out with a circular saw commenced by boring a hole with a small [illegible]
[illegible], the same timber being taken for the doors; small stripes as laths, 1½ inch
wide (and one eighth thick are glued (and sprigged on around the edges of the
doors to cover the cracks. The holes are then bored in with a [illegible] [illegible]
3/4 of an inch, and below ½ deep. Whenever the body is placed on its legs, which
are 2½ feet high by 4 inches thick tapered off below, and stripes of ten inches
wide nailed on, crossways (and lengthways, the legs are screwed on from the out
side right under the out most uprights, in order that after they spoil, others
may be replaced. The [illegible] boards, 3 inches wide are then screwed on (the
whole length [illegible]) The sticks when pointed off at the ends, [illegible] [illegible]
of 2 inches [illegible] are then put in. N.B. No [illegible] sticks are in the [illegible]
The doors are then hung, each having two hinges (and a lock. The hinges on
the two [illegible] side doors or shutters, are put in below, eight inches from the [illegible]

BEST AVAILABLE COPY

[illegible] sweet, in abundance, [illegible]
[illegible] be removed with the slightest danger or trouble. As soon as the bees [illegible] their combs to the holes behind the doors, two other large bee hou[ses] [are] screwed on, hole upon hole, behind the doors with some of the abovemen[tioned] [illegible] thinly smeared around the holes; when the slides are remov[ed], a great quantity of bees will come out of the full into the empty houses; [and] after they have worked their way into the empty ones they are removed [and] others replaced for the reception of more, &c. From the main body [illegible] the honey is taken in winter time, when a door is opened in a cold morning [before] the [illegible] is quite [illegible], the bees will retire and become stiffened [illegible] the combs are cut through right in the middle between the sticks [with] a sharp pointed thin bended tin plate, and a stick with its [illegible] [illegible] removed, then a stick full can be taken out from the [illegible] [illegible] [illegible] every morning, until the one half end is conveyed away. In the spring these sticks are [illegible] to be replaced; that the honey of every other half end can be taken out every winter. By pursuing this plan the bees continue in mak[ing] new combs, [and] filling up every other half end every summer, [illegible] [illegible] are some of these "[illegible]" so large as to contain upwards of three [ho]gs heads [and] [illegible] commenced with eighteen hives. One hundred and sixty gallons of honey have been taken out of one house in one year. The superiority of this [invention] over any thing of the kind hitherto in use, is unquestionable [and] individuals who have made use of this plan are [illegible] in saying that the bees thrive better, [and] make ten times the quantity of honey which they did in the former plans.

Know all Men by these Presents. That we the undersigned have had a perfect trial [and] examination of Mr Greves' "Patent Bee House" two summers [and] we candidly believe that it will answer [every] purpose as it is recommended; any person wishing to see a honey comb built in two summers eight feet long [and] four wide can be gratified with the sight by calling with us. Jacob [illegible]. Cornelius [illegible], [illegible] [illegible]. Philip Gable, Reading Berks County Pa. December 7. 1834.
On this 26th day of May, 1835, before the subscriber, a Justice of the Peace in

BEST AVAILABLE COPY

[illegible] personally appeared the aforesaid William Groves [illegible] made solemn oath according to law, that he verily believes himself [illegible] the true [illegible] original inventor, or discoverer of the invention above specified [illegible] described for a Bee House [illegible] that he is a citizen of the United States.

C. H. Wharton.

[illegible] under my hand [illegible] the City of Washington this 12th day of June A[illegible]

[illegible] Andrew Jackson

By the President. John Forsyth. Secretary of State."

" I do certify that the foregoing Letters Patent, were delivered to me on the 13th day of June A[illegible] 1835. to be examined [illegible] I have examined the same [illegible] [illegible] them conformable to law B. F. Butler Attorney General of the United States

[illegible]

James C Conner [illegible] 14, [illegible]
Letters Patent

The Schedule referred to in these Letters Patent and making part of the same, containing a description in the words of the said James C Conner himself of his Improvement in Canal Boats for the Transhipment of Merchandize.

Schedule or Specification of James C Conner's improved Canal Boat for carrying merchandize and general freight to be used when transhipment from Canal to Rail or other roads and vice versa is necessary.

Construct the hull of the Boat [illegible] in all respects similar to those used on the Canal to be navigated. Construct a short stern deck such as is now [illegible] four or five feet long next to which deck erect [illegible] in 6 feet for a Cabin. Also construct a short [illegible] deck say four or five feet long.

These decks and Cabin will occupy from fourteen to sixteen feet in length